(12) United States Patent
Polycarpou et al.

(10) Patent No.: US 6,466,410 B2
(45) Date of Patent: *Oct. 15, 2002

(54) SLIDER FOR A DATA STORAGE DEVICE WITH HEAD DISC INTERFACE FOR CONTACT STARTS AND STOPS ("CSS")

(75) Inventors: Andreas A. Polycarpou, Champaign, IL (US); Zine-Eddine Boutaghou, Vadnais Heights, MN (US); Jorge Vincent Hanchi, Eden Prairie, MN (US); Peter Raymond Segar, Burnsville, MN (US); David Gerard Wobbe, Shakopee, MN (US); Mary C. Hipwell, Minneapolis, MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,302

(22) Filed: Oct. 12, 1999

(65) Prior Publication Data

US 2002/0012199 A1 Jan. 31, 2002

Related U.S. Application Data (60) Provisional application No. 60/104,312, filed on Oct. 13, 1998.

(51) Int. Cl.[7] ................................................ G11B 5/60
(52) U.S. Cl. ..................................................... 360/236.6
(58) Field of Search ............................ 360/235.8, 236.6

(56) References Cited

U.S. PATENT DOCUMENTS

| | | | | |
|---|---|---|---|---|
| 5,034,828 A | * | 7/1991 | Ananth et al. | 360/236.6 |
| 5,079,657 A | * | 1/1992 | Aronoff et al. | 360/236.6 |
| 5,231,613 A | * | 7/1993 | Nakayama et al. | 369/13 |
| 5,815,346 A | * | 9/1998 | Kimmal et al. | 360/236.6 |
| 5,841,608 A | * | 11/1998 | Kasamatsu et al. | 360/236.6 |
| 5,991,118 A | * | 11/1999 | Kasamatsu et al. | 360/236.6 |
| 6,188,547 B1 | * | 2/2001 | Gui et al. | 360/236.5 |
| 6,212,042 B1 | * | 4/2001 | Gui et al. | 360/236.6 |
| 6,215,621 B1 | * | 4/2001 | Boutaghou | 360/236.6 |
| 6,233,118 B1 | * | 5/2001 | Boutaghou et al. | 360/235.4 |
| 6,236,543 B1 | * | 5/2001 | Han et al. | 360/236.6 |
| 6,243,233 B1 | * | 6/2001 | Yamamoto et al. | 360/236.6 |

FOREIGN PATENT DOCUMENTS

JP         9-282645         * 10/1997

* cited by examiner

Primary Examiner—Jefferson Evans
(74) Attorney, Agent, or Firm—Westman, Champlin & Kelly, P.A.

(57) ABSTRACT

A slider with contact interface features for contact starts and stops. Contact interface features include elevated leading edge contact interface features including elevated contact pads, ribs or protective layer. In addition, the invention includes a slider with a trailing edge contact interface at the bearing surface having a relatively rough surface structure including textured or rough surface patterns.

20 Claims, 10 Drawing Sheets

SLIDER FOR A DATA STORAGE DEVICE WITH HEAD DISC INTERFACE FOR CONTACT STARTS AND STOPS ("CSS")

BACKGROUND OF THE INVENTION

The present invention claims priority to Provisional Application Ser. No. 60/104,312 filed Oct. 13, 1998, entitled "PAD ASSISTED LANDING SLIDER ON POLISHED MEDIA."

The present invention relates to data storage systems. More specifically, the present invention relates to a head slider for contact stops and starts ("CSS").

Sliders support transducer elements and include an air bearing surface which supports the transducer elements above the disc surface for read and write operations. Sliders "take off" and land from a landing zone on the disc surface for contact starts and stops ("CSS"). For operation, rotation of the disc provides airflow to the air bearing surface of the slider to raise the slider from the landing zone for proximity recording. Sliders are coupled to an actuator block to position the sliders relative to selected data tracks on the disc surface for read/write operations.

Stiction between the slider and the surface of the disc affects "take off" of the slider from the disc surface. Stiction increases the breakaway velocity and power required to lift the slider from the disc surface. To control stiction, the media or disc surface is roughened or textured to reduce stiction at a head-disc interface. However, wear of textured surfaces can increase stiction at the head disc interface. Also, slider fly height is decreasing and higher media surface roughness averages increases glide avalanche dimensions and head-disc interference.

Landing pads can reduce slider-disc surface contact area to reduce stiction. Sliders fly at a pitch angle with the trailing edge located closer to the disc surface than the leading edge. Landing pads toward the trailing edge can contact the disc surface, particularly at lower slider fly heights. The present invention addresses these and other problems.

SUMMARY OF THE INVENTION

The present invention relates to a slider with contact interface features for contact starts and stops. The contact interface features include elevated leading edge contact interface features including elevated contact pads, ribs or protective layer. In addition, the invention includes a slider with a trailing edge contact interface at the bearing surface having a relatively rough surface structure including textured or rough surface patterns.

BRIEF DESCRIPTION OF THE DRAWINGS

FIGS. 8-1 through 8-5 are cross-sectional views taken along line 8—8 of FIG. 7 illustrating alternate embodiments of micro-pores formed on the air bearing surface for stiction control.

DETAILED DESCRIPTION OF THE ILLUSTRATIVE EMBODIMENTS

Figure 1:
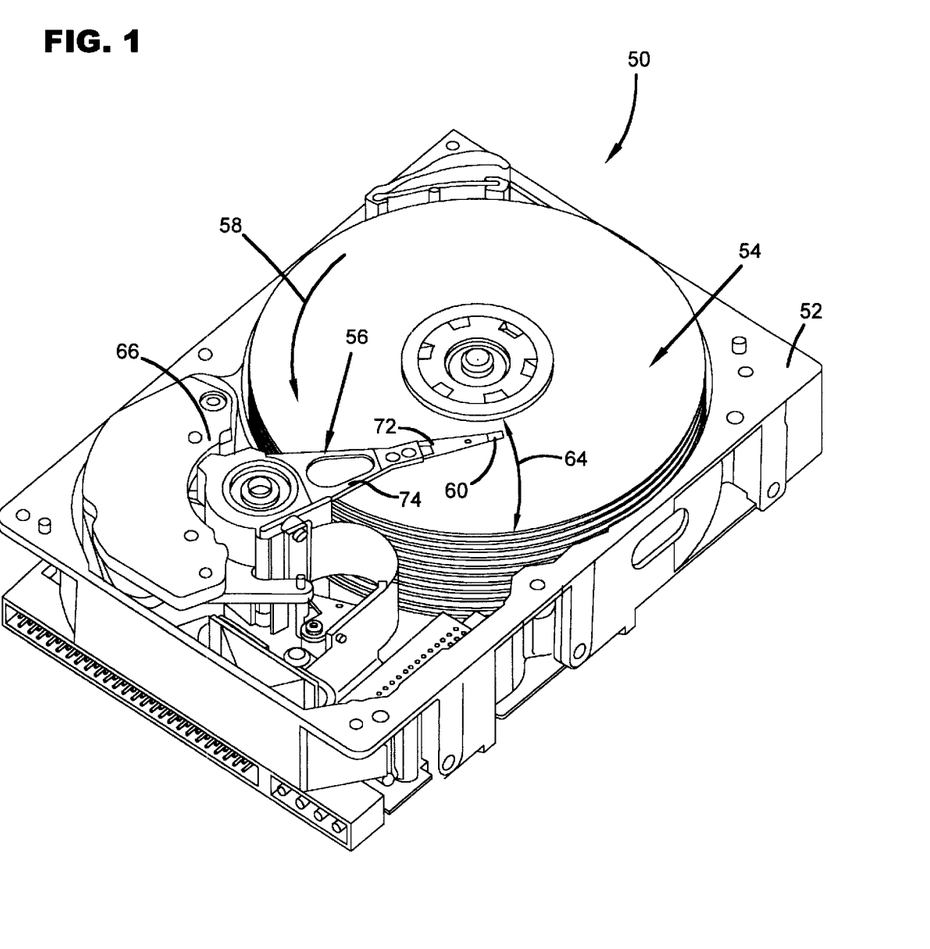
FIG. 1 is a perspective illustration of an embodiment of a disc drive.

FIG. 1 is a perspective illustration of a disc drive 50 including a chassis 52, discs 54, and actuator assembly 56. Discs 54 are rotationally coupled to chassis 52 via a spindle motor (not shown) for rotation, as illustrated by arrow 58. The actuator or E-block 56 is movably coupled to the chassis 52 to movably support heads 60 for reading and/or writing data to and from discs 54. As shown in FIG. 1, actuator block 56 rotates as illustrated by arrow 64 to move heads 60 along an arcuate path for placement relative to data tracks of a disc 54 to read or write data relative to the disc surface. Actuator block 56 is moved via operation of a voice coil motor VCM 66.

Figure 2:
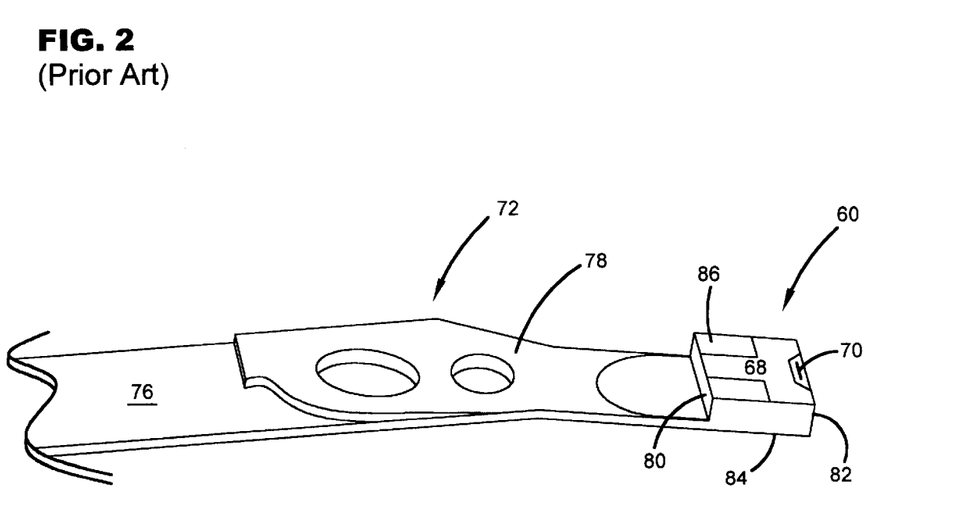
FIG. 2 is an illustration of a suspension assembly supporting a head disc slider.

As shown in FIG. 2, heads 60 include a slider 68 which supports transducer elements 70 (illustrated diagrammatically) for read and write operations. Transducers may be inductive type transducers, magnetoresistive or magneto-optical transducers. Slider 68 is coupled to actuator block 56 via a suspension assembly 72 coupled to actuator arms 74 on the E-block 56 as illustrated in FIG. 1. As shown in FIG. 2, suspension assembly 72 includes a load beam 76 and a gimbal spring 78. Gimbal spring 78 supports slider 68 to pitch, roll and follow the topography of the disc in a known manner.

Slider 68 is formed of a rigid member or body having a leading edge 80, a trailing edge 82, an upper surface 84, and an air bearing 86. The upper surface 84 is operably coupled to gimbal spring 78 shown in FIG. 2 to flexibly support slider 68. The lower air bearing 86 faces the disc surface for read and write operations. Prior to operation, slider 68 is parked on the disc surface for contact starts and stops ("CSS"). Rotation of the disc 54 creates a fluid or air flow under the bearing surface from the leading edge 80 to raise the slider 68 above the disc surface for proximity recording. Prior sliders 68 include a leading edge step or taper (not shown in FIG. 2) for "lift-off". Stiction force holds the slider 68 to the disc surface and sufficient power is required to "breakaway" or overcome the stiction holding the slider 68 to the disc surface.

Laser textured disc surfaces reduce the stiction at the head-disc interface. However, laser texturing is expensive and increases glide avalanche dimensions. An increased glide avalanche dimension increases the propensity for head-disc contact, particularly at lower fly heights. Head-disc contact can damage heads and disc media surfaces. In particular, as the roughness average of the texturing increases, the stiction decreases while the glide avalanche dimension increases, thus, increasing head-disc contact. Stiction pads on sliders decrease the contact surface area interface between the head and the disc surface to reduce stiction without increasing the glide avalanche dimension. However, the slider flies at a pitch angle with the trailing edge of the slider flying closer to the disc surface than the leading edge. During "take-off", a trailing edge portion of the slider can tip forward and contact the disc surface. Stiction pads located toward the leading edge reduce the leading contact interface area to reduce stiction between the slider and disc surface. However, stiction pads located at the trailing edge of the slider can contact the disc media, particularly at lower fly heights damaging the disc media generating debris or degrading drive operations.

The present invention relates to sliders having contact interface features for head-disc interface for contact starts and stops. As shown in FIGS. 3–8, slider 90 includes leading and trailing edge contact interface features for contact starts and stops, where like number, are used to refer to like parts in the previous FIGS. As shown, slider 90 includes an elevated leading edge contact interface and a trailing edge contact interface including a rough surface structure 102 formed on the air bearing. The elevated contact interface reduces slider-disc contact area at the leading edge and elevates a leading edge portion of the slider for "take off". The rough surface structure 102 provides a trailing edge contact interface to reduce the head-disc contact area without increasing the fly height dimension. Since the trailing edge contact interface is formed at the bearing surface, the contact interface does not interfere with the disc surface at lower fly heights.

In particular, sliders are formed of a ceramic substrate, such as an $Al_2O_3$ TiC substrate. Sliders are fabricated from a wafer and individual sliders are cut from the wafer. The stress induced by separating sliders from the wafer or bar can create a crown forming a curved lower surface. The crown can also be created and adjusted independently. The crown can increase the head-disc contact surface area at a trailing edge portion of a slider, especially during tipping, for contact starts and stops. The rough surface structure 102 at the trailing edge reduces the surface contact area of the crown. The contact interface features described provide a contact interface for a relatively smooth disc media, thus reducing expensive media texturing and reducing the glide avalanche dimension for lower fly heights, without significantly increasing stiction and power required for "take-off".

Figure 3:
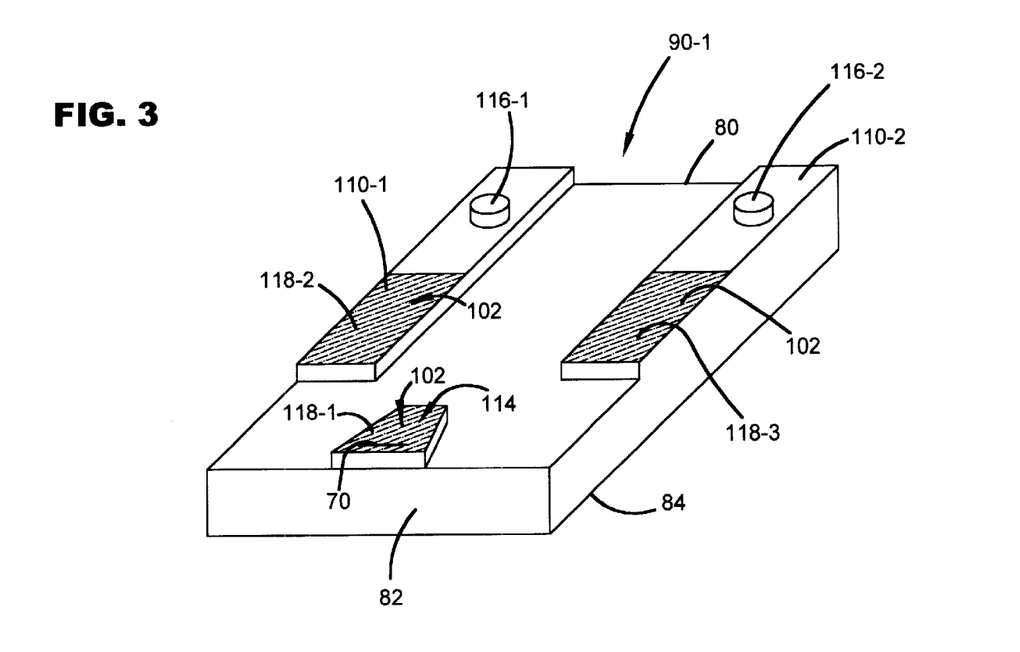
FIG. 3 is a perspective illustration of an embodiment of a slider of the present invention.

In a slider embodiment 90-1 illustrated in FIG. 3, the air bearing includes side rails 110-1, 110-2 and a center rail 114. Side rails 110-1, 110-2 extend from the leading edge 80 to a location spaced from the trailing edge 82. As shown, the elevated leading edge contact interface includes contact pads 116-1, 116-2 toward the leading edge of side rails 110-1, 110-2. Pads are formed preferably of a deposited material, such as diamond-like carbon (DLC) or other tribological material for interface with the disc media surface. Pads can be formed of various shapes and sizes on the air bearing surface and the size and shape of pads 116-1, 116-2 is not limited that shown. The trailing edge contact interface includes textured bearing surfaces 118-1, 118-2, 118-3 on the center rail 114 and along a portion of the side rails 110-1, 110-2 toward the trailing edge. The bearing surface can be textured by known mechanical texturing, ion milling, or chemical etching techniques to provide a roughened surface structure for contact interface. Preferably, the textured surface structure 118 is formed by an ion milling or chemical etching process to provide a rough surface structure without sharp peaks for contact interface with the disc surface.

Figure 4:
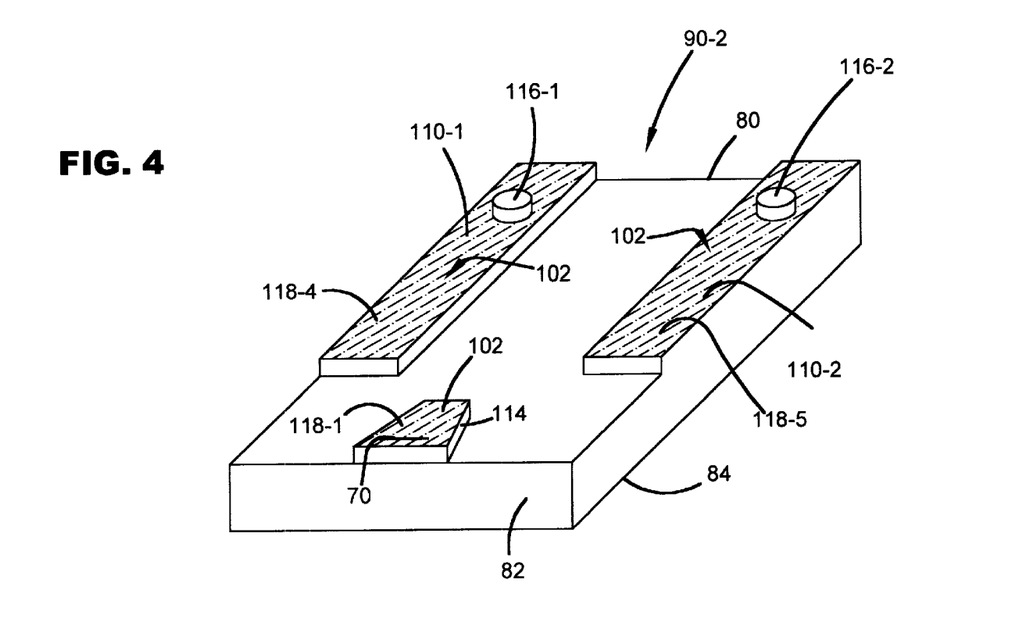
FIG. 4 is a perspective illustration of another embodiment of a slider of the present invention.

An alternate slider embodiment 90-2 is illustrated in FIG. 4. The air bearing of slider 90-2 includes side rails 110-1, 110-2 and center rail 114. As shown, side rails 110-1, 110-2 include contact pads 116-1, 116-2 toward the leading edge to provide an elevated leading edge contact interface. In the embodiment shown, center rail 114 and side rails 110-1, 110-2 include a textured surface structures 118-1, 118-4, 118-5. The textured surfaces 118-4, 118-5 extend along the length of side rails 110-1, 110-2 and textured surface 118-1 covers the center rail 114.

Figure 5:
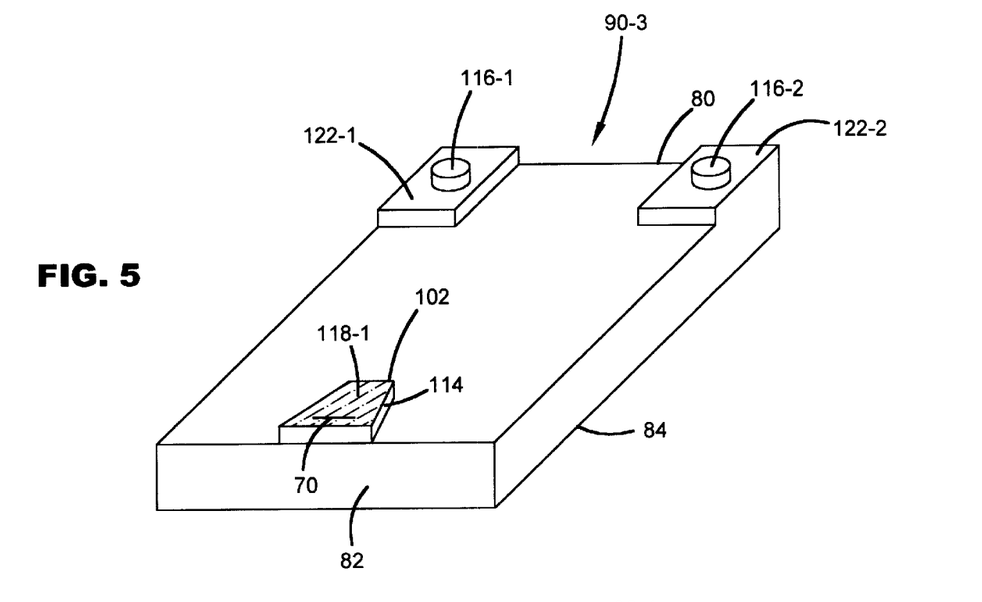
FIG. 5 is a perspective illustration of another embodiment of a slider of the present invention.
Figure 6:
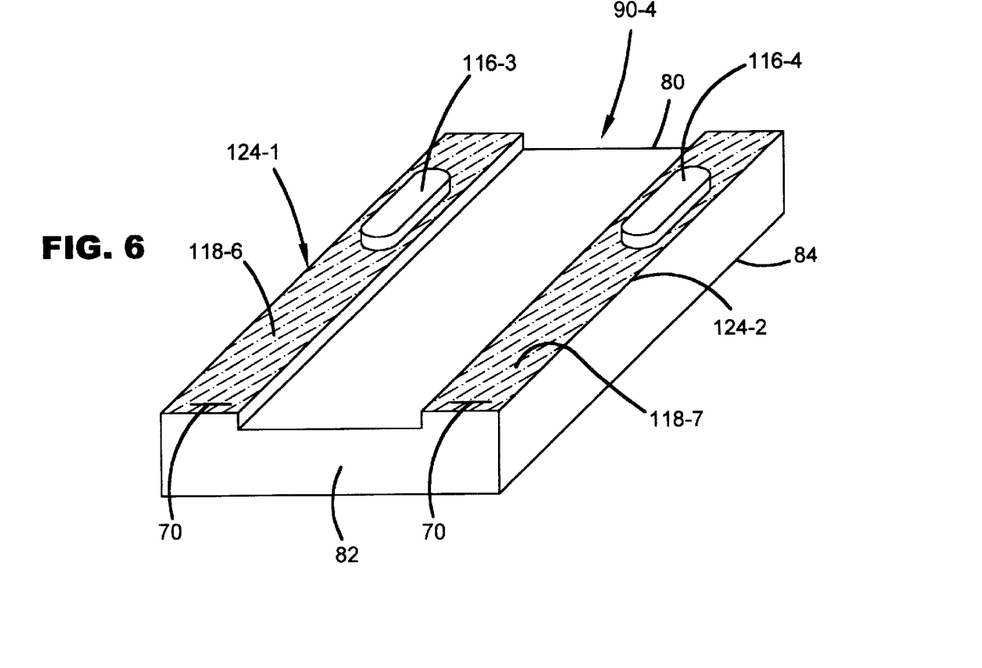
FIG. 6 is a perspective illustration of another embodiment of a slider of the present invention.

In another slider embodiment 90-3 illustrated in FIG. 5, the air bearing includes shortened side rails 122-1, 122-2 and center pad 114. Shortened side rails 122-1, 122-2 extend along a leading edge portion and contact pads 116-1, 116-2 are deposited on side rails 122-1, 122-3. The leading edge contact interface includes a textured bearing surface 118-1 formed on the center rail 114. In an alternate slider embodiment 90-4, shown in FIG. 6, the air bearing includes side rails 124-1, 124-2 which extend along the entire length of the slider from the leading edge 80 to trailing edge 82. The elevated leading edge contact interface includes elongated pads 116-3, 116-4 formed at the leading edge of side rails 124-1, 124-2. The slider 90-4 includes textured bearing surfaces 118-6, 118-7 along the length of rails 124-1, 124-2 between the leading edge 80 and trailing edge 82.

Figure 7:
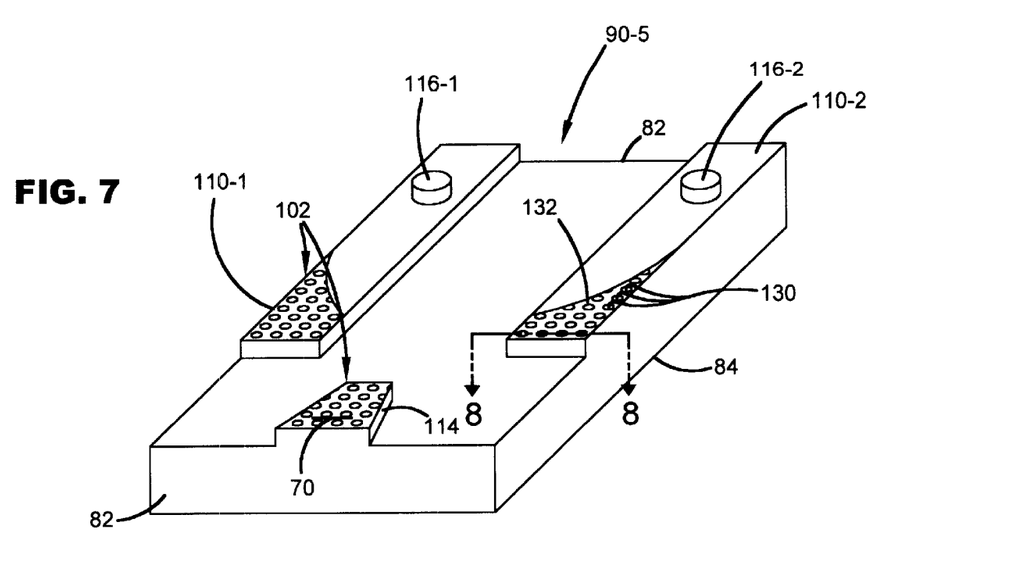
FIG. 7 is a perspective illustration of another embodiment of a slider of the present invention.

In alternate slider embodiments as illustrated in FIGS. 7–8, the trailing edge contact interface includes a rough surface structure is formed of a plurality of spaced micro pores 130 extending below the air bearing surface 132. The micro-pores 130 contribute in reducing the area of contact for stiction control and also act as micro aerodynamic bearings. The micro-pores 130 reduce the contact force of the slider and thus reduce friction and wear of the disc media for contact starts and stops. In the slider embodiment 90-5 illustrated in FIG. 7, the air bearing includes side rails 110-1, 110-2 and center rail 114. Contact interface pads 116-1, 116-2 are formed on a leading edge of side rails 110-1, 110-2. Micro-pores 130 are formed on center rail 114 and along a portion of side rails 110-1, 110-2 toward the trailing edge to provide a trailing edge contact interface for contact starts and stops. Micro pores 130 can be formed by various fabrication techniques including for example, photolithography, chemical etching or ion milling techniques.

FIGS. 8-1 through 8-4 illustrate alternate embodiment or shapes for micro-pores 130. The shape, size and pore density can vary to achieve load carrying capacity at low and high speeds. The depth of the micro-pores 130 can vary to reduce the "build up" of lubricant. As shown in FIG. 8-1, micro-pores 136-1 are "U" shaped, in FIG. 8-2, micro-pores 130-2 are "V" shaped, in FIG. 8-3, micro-pores 130-3 have a flat base 134 and sloped sides 136 and in FIG. 8-4, micro-pores 130-4 are square shaped. To avoid "build up" of lubricant during dwell time, channels 138 as illustrated in FIG. 8-5 can be formed below the bearing surface 132 to connect micro-pores 130 to avoid the trapping of lubricant which can increase stiction.

Sliders 90 have application for a relatively polished disc media having a roughness average Ra=0.8–1.0 nm for low glide avalanche, or smoother surfaces having a Ra<0.8 nm. The leading edge pads reduce the head-disc contact and elevate the leading edge of the slider for "take-off". In one embodiment the rough surface structure at the trailing edge provides a roughness average of approximately Ra=3.9 nm to increase the combined roughness of the disc and slider interface at the trailing edge for a polished disc media (eg.

Ra=0.8 nm of slider+Ra 3.9 nm of disc media >Ra=4.0 combined nm) for reduced stiction and lower fly heights.

Figure 9:
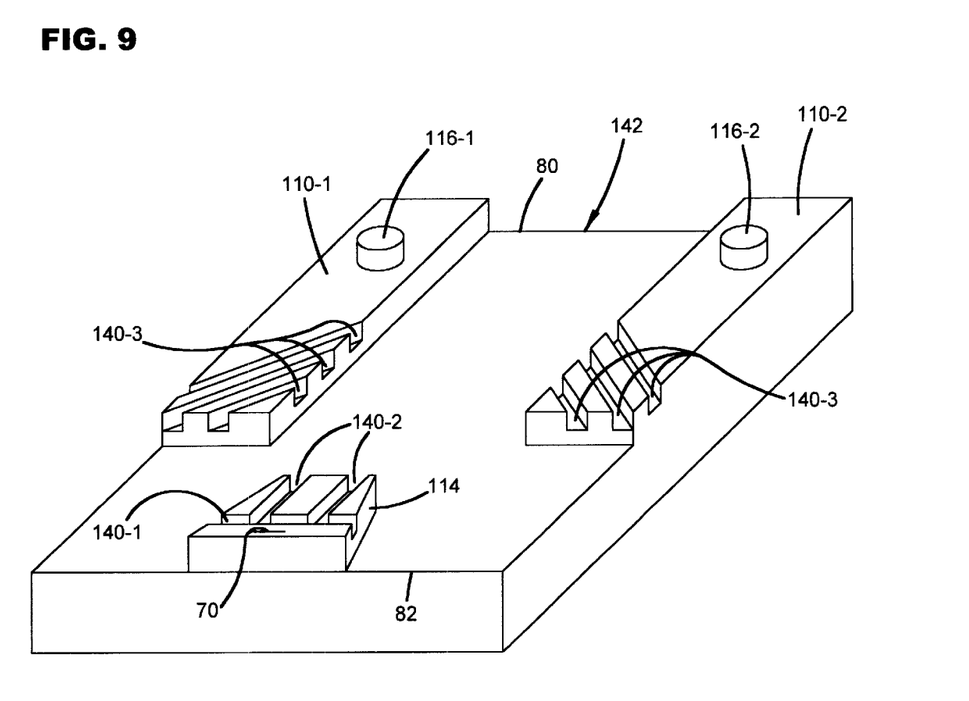
FIGS. 9–13 are perspective illustrations of alternate embodiments of a slider of the present invention.

In an alternate slider embodiment, the trailing edge portion of the air bearing includes a plurality of trenches 140 on center rail and leading edge portions of side rails 110-1, 110-2. Trenches 140 extend below the air bearing surface to reduce the head disc contact interface area without interference at low fly heights. The trenches also aid in lubricant migration to reduce meniscus and power required for "take-off" and provide airways for faster formation of the air bearing. As shown in FIG. 9, slider 142 includes leading edge pads 116-1. 116-2. Slider 142 also includes traverse trench 140-1 and a plurality of spaced longitudinal trenches 140-2 opened to traverse trench 140-1. Side rails 110-1, 110-2 include a plurality of spaced diagonal trenches 140-3 as shown toward the trailing edge of side rails 110-1, 110-2. Trenches are formed by photolithography, ion milling or chemical etching techniques.

During "power up" or "power down", the leading edge 80 can slam into the disc surface. Head disc interface can damage the disc and head and can loosen debris. The propensity for head-disc contact during "power-up" and "power-down" increases for lower fly heights, particularly for a disc media with a relatively high surface roughness. Floating debris can pile and can increase stiction and lead to interface failure. Increased stiction as well as dynamic perturbations during "take-off" can lead to leading edge contact with the disc media. Multiphase sliders such as $Al_2O_3$—TiC have a relatively high degree of surface roughness and high friction and thus head-disc contact can damage and wear the disc surface.

To reduce friction, wear and damage during head-disc contact, a leading edge protective layer formed of a relatively smooth tribological material, such as diamond-like carbon is deposited to the leading edge of the slider. The deposited layer forms an elevated leading edge contact which elevates the leading edge of the slider for "take-off" with improved wear performance. The elevated leading edge contact also reduces the head-disc contact area for contact starts and stops. The leading edge protective layer provides a tribological contact interface and increases separation between the surfaces of the slider and disc surface to reduce head disc contact between rough slider edges and surfaces and debris generation as well as provide a smoother profile for "take-off".

Figure 10:
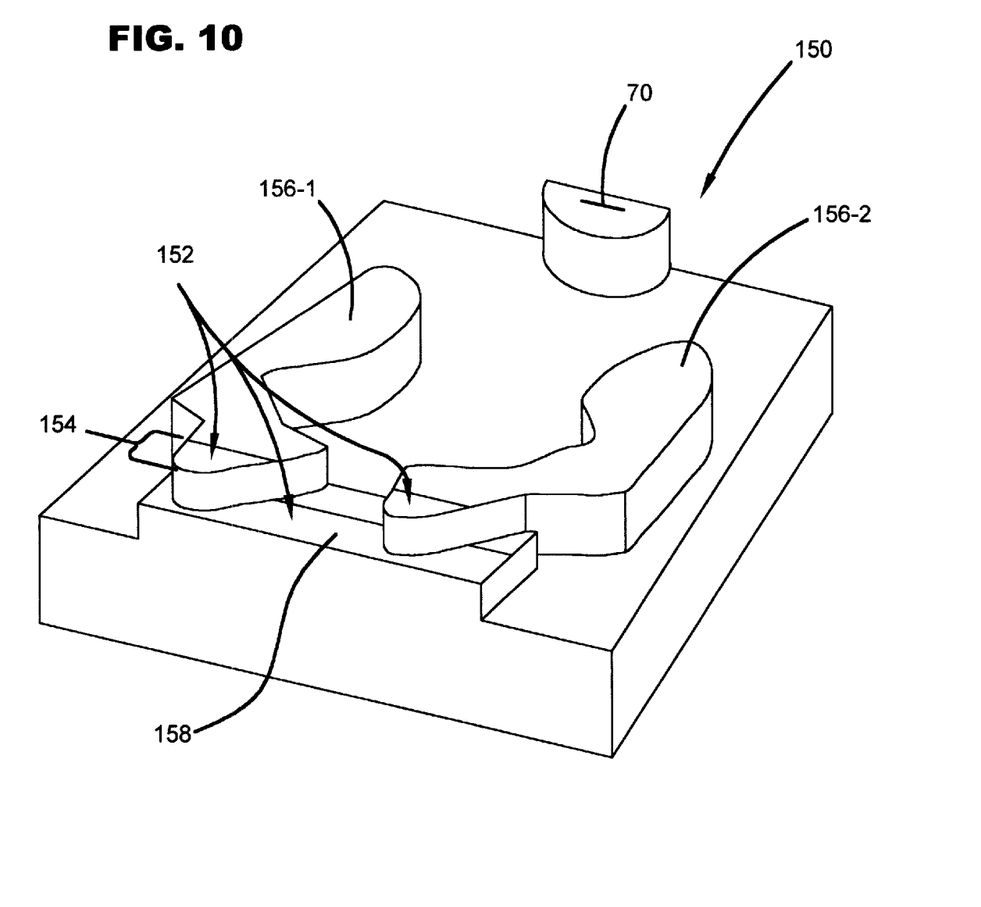
Figure 11:
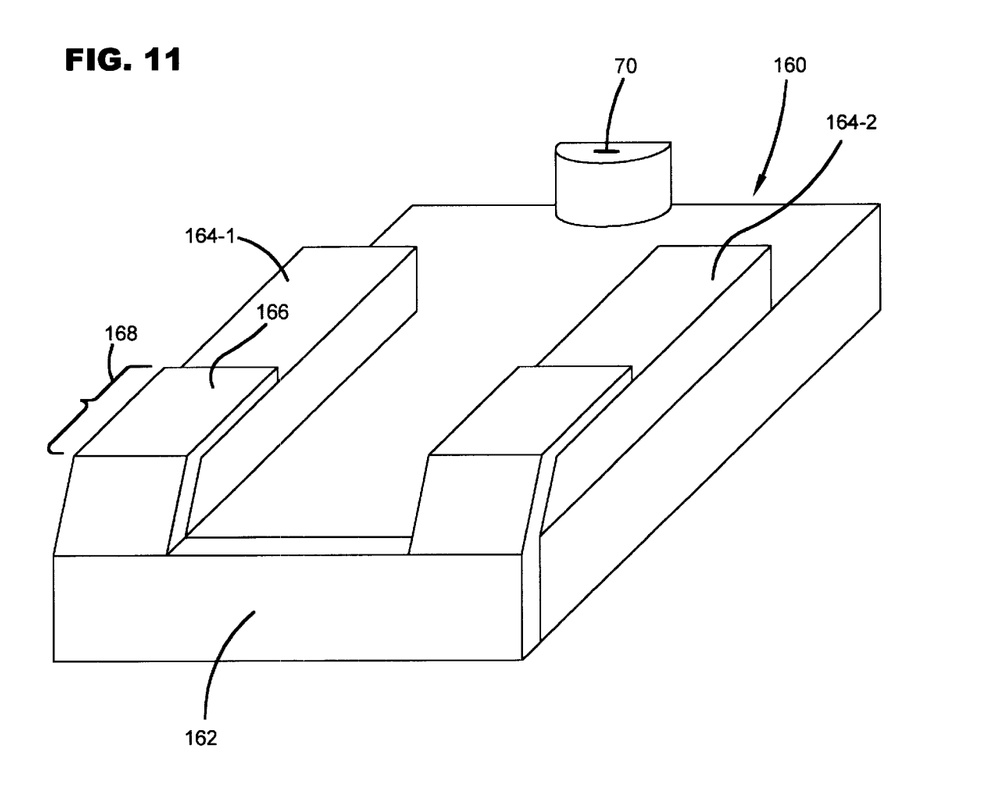

Slider 150 illustrated in FIG. 10 includes protective layer 152 deposited on a leading edge portion 154 of side rails 156-1, 156-2 and a leading edge step 158. Although not shown, protective layer 152 can extend to slider edges, corners and cavity surfaces depending upon the fabrication process. FIG. 11 illustrates an embodiment of a slider 160 including a tapered leading edge 162 and side rails 164-1, 164-2. As shown, protective layer 166 is deposited on the tapered leading edge 162 and a leading edge portion 168 of side rails 164-1, 164-2.

Figure 12:
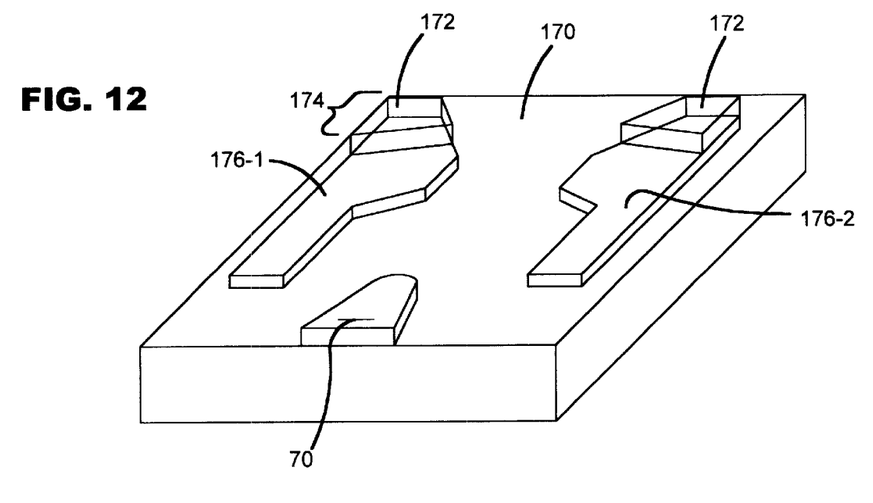
Figure 13:
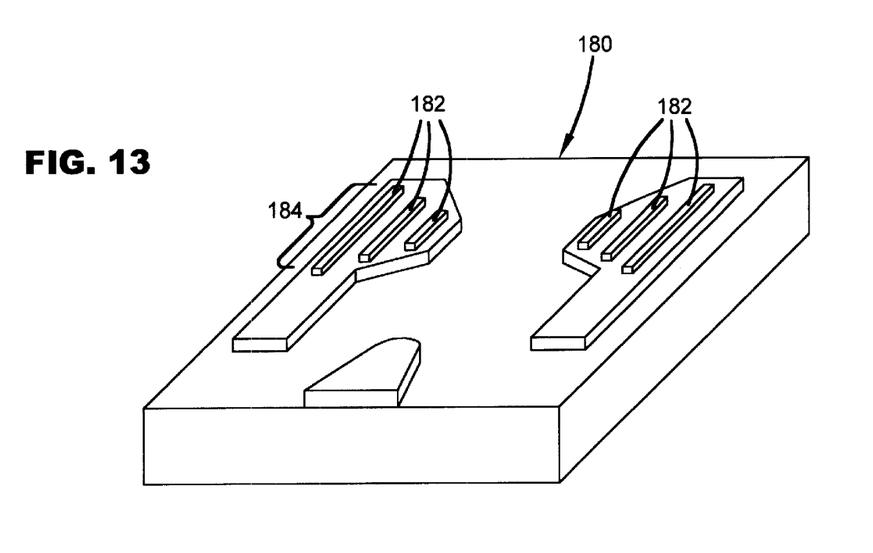
Figure 81:
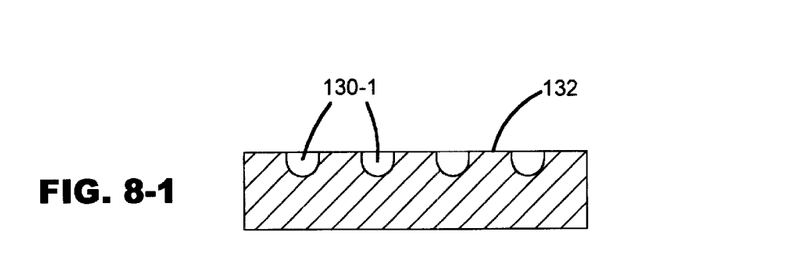
Figure 82:
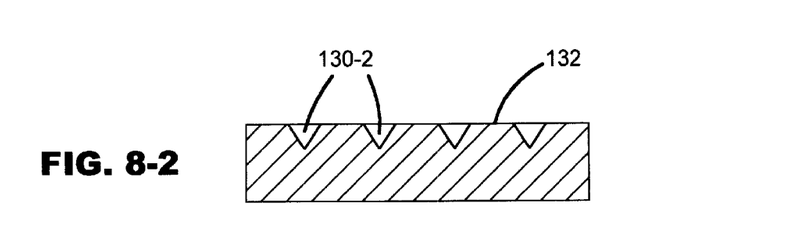
Figure 83:
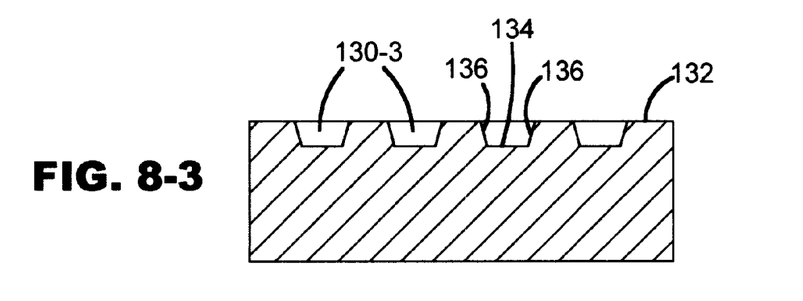
Figure 84:
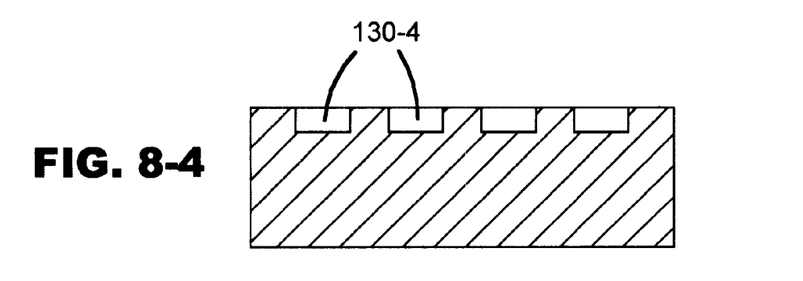
Figure 85:
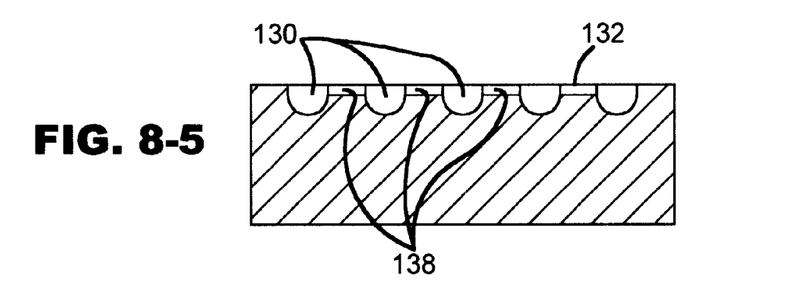

In FIG. 12, slider 170 includes a protective layer 172 over leading edge portions 174 of side rails 176-1, 176-2. The slider 170 can also include a pattern of protective pads (not shown) formed of a deposited DLC material on the air bearing surface. In FIG. 13, slider 180 includes ribs 182 deposited on and covering a leading edge portion 184 of side rails 186-1, 186-2 to provide a protective covering for the leading edge portion 184 for contact interface with the disc surface. The leading edge protective layer provides an elevated leading edge contact to reduce the head-disc surface contact area to reduce stiction and provides a smoother tribological interface to limit friction, wear and debris generation.

Although the present invention has been described with reference to preferred embodiments, workers skilled in the art will recognize that changes may be made in form and detail without departing from the spirit and scope of the invention.

What is claimed is:

1. A slider supporting at least one transducer element comprising:

a slider body including a leading edge and a trailing edge and an air bearing including a raised bearing surface and at least one recessed bearing surface;

a leading edge contact interface including an elevated contact interface extending above the raised bearing surface along a leading portion of the slider; and a trailing edge contact interface at the raised bearing surface including a textured surface structure on the raised bearing surface along a trailing portion of the slider and the textured surface structure including an array of spaced micro depressions spaced between opposed sides of the raised bearing surface and along a length of the raised bearing surface.

2. The slider of claim 1 wherein the textured surface structure is a random mechanically textured surface.

3. The slider of claim 1 wherein the textured surface structure includes a plurality of patterned micro-pores extending below the raised bearing surface.

4. The slider of claim 3 including channels connecting the micro-pores.

5. The slider of claim 1 wherein the textured surface structure is formed by one of a photolithography, ion milling, chemical etching, or mechanical grinding process.

6. The slider of claim 1 wherein the air bearing includes a center rail and the textured surface structure is formed on the center rail.

7. The slider of claim 1 wherein the air bearing includes side rails and the textured surface structure is formed on a trailing edge portion of the side rails.

8. The slider of claim 1 wherein the elevated contact interface includes elevated pads formed on the leading portion of the slider.

9. The slider of claim 8 wherein the elevated pads are formed of a diamond-like carbon.

10. The slider of claim 1 wherein the elevated contact interface includes a plurality of ribs formed on a leading edge portion of the raised bearing surface.

11. The slider of claim 1 wherein the elevated contact interface comprises a protective layer deposited on a leading edge portion of the raised bearing surface.

12. The slider of claim 1 in combination with a disc having a polished media surface.

13. A slider comprising:

a slider body having a leading edge and a trailing edge and an air bearing; and contact interface means for contact starts and stop including an elevated contact means for contact interface at a leading portion of the slider and micro textured contact means having a trenchless surface texture for contact interface at a trailing portion of the slider.

14. The slider of claim 13 wherein the trenchless surface texture of the micro textured contact means includes a random trenchless surface texture pattern.

15. The slider of claim 13 wherein the trenchless surface texture includes a plurality of spaced micro-pores.

16. The slider of claim 13 wherein the air bearing includes a center rail and side rails and the micro textured contact means is formed on the center rail and along a trailing portion of the side rails.

17. The slider of claim 13 wherein the air bearing includes side rails and the micro textured contact means is formed along a trailing portion of the side rails.

18. A slider comprising:

a slider body including a leading edge, a trailing edge, opposed sides, a raised bearing surface proximate to a trailing portion of the slider body and a recessed bearing surface and the slider body including a longitudinal dimension between the leading edge and the trailing edge of the slider body and a transverse dimension between the opposed sides of the slider body;

a raised contact interface extending above the raised bearing surface proximate a leading portion of the slider body; and a textured surface structure proximate to the trailing portion of the slider body including discrete depressed surface portions and raised surface portions longitudinally and transversely dispersed over the raised bearing surface proximate to the trailing portion of the slider body.

19. The slider of claim 18 wherein the depressed and raised surface portions are randomly dispersed.

20. The slider of claim 19 wherein the depressed and raised surface portions are formed by a mechanical texturing process.

* * * * *

UNITED STATES PATENT AND TRADEMARK OFFICE
CERTIFICATE OF CORRECTION

PATENT NO.   : 6,466,410 B1                                             Page 1 of 1
DATED         : October 15, 2002
INVENTOR(S)  : Polycarpou et al.

It is certified that error appears in the above-identified patent and that said Letters Patent is hereby corrected as shown below:

<u>Title page,</u>
Item [56], U.S. PATENT DOCUMENTS, insert the following:

| | | | |
|---|---|---|---|
| -- 4,212,044 | 7/1980 | Plotto | 360/103 |
| 4,553,184 | 12/1985 | Ogishima | 360/103 |
| 4,636,894 | 1/1987 | Mo | 360/103 |
| 4,646,180 | 2/1987 | Ohtsubo | 360/103 |
| 4,757,402 | 7/1988 | Mo | 360/103 |
| 4,802,042 | 1/1989 | Strom | 360/103 |
| 4,961,121 | 10/1998 | Astheimer et al. | 360/103 |
| 5,200,868 | 4/1993 | Chapin et al. | 360/103 |
| 5,345,353 | 9/1994 | Krantz et al. | 360/103 |
| 5,572,386 | 11/1996 | Ananth et al. | 360/103 |
| 5,742,518 | 4/1998 | Gui et al. | 364/508 |
| 5,751,517 | 5/1998 | Argarwal | 360/103 -- |

Signed and Sealed this

Eleventh Day of March, 2003

JAMES E. ROGAN
*Director of the United States Patent and Trademark Office*